United States Patent Office 2,828,300
Patented Mar. 25, 1958

2,828,300
BLOWING AGENTS

William H. von Glahn, Loudonville, N. Y., and Bernard Rudner, Baltimore, Md., assignors to General Aniline & Film Corporation, New York, N. Y., a corporation of Delaware No Drawing. Application December 30, 1955
Serial No. 556,451

8 Claims. (Cl. 260—140)

This invention relates to novel chemical compounds obtained by reacting an aryl diazonium salt with an aryl sulfonic acid nitramide. Compounds of the type embodied in this invention are relatively stable at normal temperatures, but may be decomposed with evolution of nitrogen gas as elevated temperatures, and are, thus, of interest as "blowing" agents for the production of foamed rubber, or other organo plastics; and are, also, of interest in explosives, particularly as explosion initiators.

The compounds of this invention, as stated, are produced by reacting aryldiazonium salts with arylsulfonic acid nitramides or their salts. The process is believed to proceed in the manner outlined in the following equation, and the novel products are believed to have the formula represented therein:

EQUATION I $$\underset{\underset{Cl}{|}}{Ar\!-\!N\!\equiv\!N} + \underset{\underset{NO_2}{|}}{\overset{H}{\underset{|}{N}}\!-\!O_2S.Ar'} \longrightarrow \underset{\underset{N\!-\!NO_2}{|||}}{Ar\!-\!N\!-\!O\!-\!\overset{O}{\underset{||}{S}}\!-\!Ar'}$$

$$\text{or } (Ar\!-\!N\!\equiv\!N) + (O_2N\!-\!\underset{\underset{O}{||}}{\overset{O}{\underset{||}{N}}}\!-\!\overset{O}{\underset{||}{S}}\!-\!Ar)$$

However, there is a possibility that, instead of proceeding as above, the reaction may proceed in a manner illustrated in Equation II below, and that the product has the formula indicated therein; or, possibly, even a mixture of these two types of products is obtained:

EQUATION II $$\underset{\underset{Cl}{|}}{Ar\!-\!N\!=\!N} + \underset{\underset{NO_2}{|}}{\overset{H}{\underset{|}{N}}\!-\!O_2S.Ar'} \longrightarrow Ar\!-\!N\!=\!N\!-\!\underset{\underset{NO_2}{|}}{N.SO_2\!-\!Ar'}$$

It is understood that, in the above equation, Ar and Ar' are aryl radicals, which may contain substituents other than those which furnish water solubility; i. e. —COOH and —SO₃H. It is particularly preferred to employ aryldiazonium salt, and/or arylsulfonic acid nitramides, in which the aryl group contains a nitro substituent. Other substituents, which may be present in the aryl groups, are halogen, lower alkyl (methyl), sulfonamido, carbamido, hydroxy, etc.

The products of the present invention may readily be prepared by starting with an aryl amine and diazotizing this in the usual manner; and, then, reacting this with an aryl sulfonic acid nitramide or its salts (of the type disclosed in Beilstein, 11, 53). This reaction is readily accomplished by treating the diazo with the nitramide, using approximately equivalent amounts, under acidic conditions (pH below 5) and at a low temperature; e. g. 0 to 5° C. The particular temperature employed depends to a large extent on the particular reactants, and, in some cases, may be slightly higher. However, due to the very substantial risk of decomposition and explosion, temperatures of the range indicated, 0 to 5° C., are definitely to be preferred.

Due to the potentially explosive character of the products of the present invention, suitable precautions should be observed in preparing them, and in handling and testing the same. Similar precautions are generally applied as are employed in the manufacture of other compounds of explosive nature, such as trinitrotoluene, picric acid, nitroglycerine, etc.

In order to fully illustrate the preparation of the compounds of the present invention, the following specific example is given:

Example 1

5.5 g. 4-nitroaniline was treated with 100 cc. water and 10 cc. hydrochloric acid 20° Bé., then at 0–5° C. with 7.15 cc. sodium nitrite solution (31.5%). After diazotization, 8.6 g. toluene-sulfon-nitramide (see Beilstein 11, 53 for preparation of the corresponding benzenesulfonnitramide) in 50 cc. water was added. After stirring for several hours, the charge was made delta alkaline with caustic, filtered, washed and air dried. The product was a light brown powder. It melts at 68–90° C. with decomposition. The product has the probable formula:

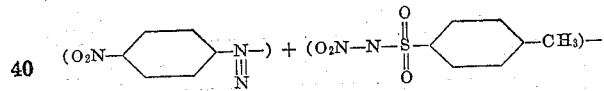

or

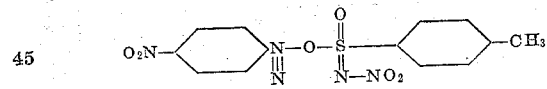

It is to be noted that the method of synthesis, described in the foregoing example, is broadly applicable to the production of compounds of the present invention, and a variety of specific compounds included within the scope of this invention may readily be prepared by the selection of the particular aryldiazonium salt and the particular arylsulfonic acid nitramide. There are illustrated below, in tabular form, a number of other products included in the present invention, which may be prepared by the process described in detail in the foregoing example, using, in place of the p-nitro aniline, an equivalent amount of an aryl amine of the type indicated; and/or using in place of the toluenesulfon-nitramide, an equivalent amount of some other aryl sulfon-nitramide of the type indicated:

| ArNH$_2$ | Ar'SO$_2$NHNO$_2$ | Product (Probable Formula) |
|---|---|---|
| 2. Aniline | Benzenesulfonnitramid | 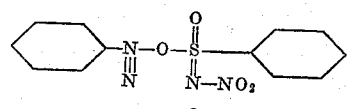 |
| 3. m-Nitroaniline | ......do...... | 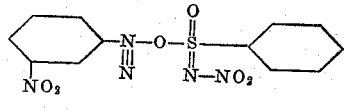 |
| 4. p-Toluidine | p-Toluenesulfonnitramid | 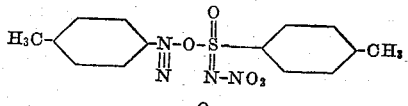 |
| 5. p-Chloroaniline | ......do...... | 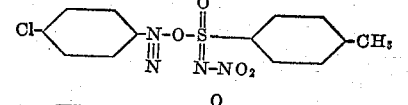 |
| 6. 1-Naphthylamine | Benzenesulfonnitramid | 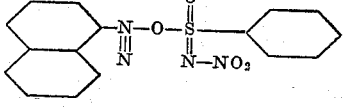 |
| 7. 2,5-Dichloroaniline | ......do...... | 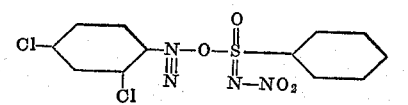 |
| 8. o-Nitroaniline | ......do...... | 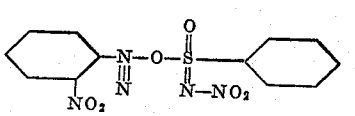 |

The novel products described above, are, as stated, relatively stable at normal temperatures, but may be decomposed under controlled conditions at elevated temperatures, and are, therefore, of particular interest for the production of foamed plastics. The use of these novel compounds as "blowing" agents for rubber, may be illustrated by the following example:

A

The following rubber composition was made up by combining the following ingredients in the usual manner on a rubber mill, at a temperature of 70°–80° F. until a homogeneous mass was formed: i. e., from 15 minutes to 3 hours.

|  | Grams |
|---|---|
| Pale crepe rubber | 259.5 |
| Blanc fixe | 169.5 |
| Whiting | 90.0 |
| Zinc oxide | 30.0 |
| Sulfur | 6.0 |
| 90% rubber+10% benzodithiazyldisulfide | 37.5 |
| 90% rubber+10% zinc dimethyldithiocarbamate | 7.5 |
| Titanium dioxide | 24.0 |

To 100 parts of the thus obtained rubber composition there was then added three parts, by weight, of the product of Example 1, above, and the mixture milled at 70–80° F. until well mixed. The mixture was then heated in a dry oven at about 220° F. for about 20 minutes. When so tested, the product of Example 1 was found to be very active as a "blowing" agent, giving a porous rubber product having small pores. It will be apparent that the amount of "blowing" agent which can be combined with the rubber, or other organo plastics, may range from .5% up to 5%, or even higher by weight, based on the content of rubber or other organo plastics and depending upon the type of article being produced.

It is not intended to confine the use of the compounds of the present invention to expanding natural rubber, since it can be applied to other organo plastics, and mixtures thereof, such as are shown in U. S. Patent No. 2,448,154, namely, alkyd resins, urea-formaldehyde resins, polymerized unsaturated materials such as polyacrylonitrile, polystyrene, polyvinyl chloride, copolymers of vinyl chloride and vinyl acetate, amorphous non-resinous plastic materials such as cellulose esters, cellulse ethers, synthetic rubbers such as polyisocyanates and the rubbery copolymers of butadiene and styrene or acrylonitrile, rubbery copolymers of isobutylene and butadiene or isoprene polychloroprene, polyisobutylene, olefin polysulfides, etc.

We claim:

1. The method of making compounds capable of being decomposed by heat with the evolution of nitrogen gas, which comprises reacting, at low temperature, an aryl diazonium salt of the formula Ar—N≡NCl, wherein Ar represents an aryl group of the benzene and naphthalene series which is free of water solubilizing acid substituents with an aryl sulfonic acid nitramide of the formula

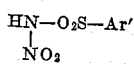

wherein Ar' represents an aryl group of the benzene series which is free of water solubilizing acid substituents.

2. The compounds produced by the process defined in claim 1.

3. The method of making compounds capable of being decomposed by heat with the evolution of nitrogen gas, which comprises reacting, at a low temperature, a benzene diazonium salt which is free of water solubilizing acid substituents, with an aryl sulfonic acid nitramide of the formula

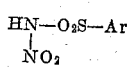

wherein Ar represents an aryl group of the benzene series which is free of water solubilizing acid substituents.

4. The compounds produced by the process defined in claim 3.

5. The method of making compounds capable of being decomposed by heat with the evolution of nitrogen gas which comprises reacting, at a low temperature, an aryl diazonium salt of the formula Ar—N≡NCl, wherein Ar represents an aryl group of the benzene and naphthalene series which is free of water solubilizing acid substituents with a benzene sulfonic acid nitramide which is free of water solubilizing acid substituents.

6. The compounds produced by the process defined in claim 5.

7. The method of making compounds capable of being decomposed by heat with the evolution of nitrogen gas, which comprises reacting, at a low temperature a benzene diazonium salt which is free of water solubilizing acid substituents with a benzene sulfonic acid nitramide which is free of water solubilizing acid substituents.

8. The compounds produced by the process defined in claim 7.

References Cited in the file of this patent

Richter's Organic Chemistry, A. J. Mee, vol. III (1946), Elsevier Publ. Co., Inc., New York, N. Y., p. 175.